DEC 3 1968 BEST AVAILABLE COPY

DEFENSIVE PUBLICATION

T857,011

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 3, 1968

857 O.G. 43

677,040

HETEROCYCLIC MONOAZO DYES CONTAINING AN N - VINYLSULFONYLETHYL - 1,2,3,4 - TETRAHYDROQUINOLINE GROUP

John I. Dale III, and Max A. Weaver, both % Tennessee Eastman Company, P.O. Box 511, Kingsport, Tenn. 37662

Filed Oct. 23, 1967. Published Dec. 3, 1968

Class 260—155

No Drawing. 18 Pages Specification

Water-insoluble monoazo compounds containing a heterocyclic diazo component and an N-vinylsulfonylethyl-1,2,3,4 - tetrahydroquinoline coupling component which are useful as dyes for hydrophobic protein or synthetic textile materials.